United States Patent
Bhatt et al.

(10) Patent No.: US 10,127,162 B2
(45) Date of Patent: Nov. 13, 2018

(54) EFFICIENT LOW COST ON-DIE CONFIGURABLE BRIDGE CONTROLLER

(71) Applicant: Intel Corporation, Santa Clara, CA (US)

(72) Inventors: Suketu U. Bhatt, Folsom, CA (US); Lakshminarayana Pappu, Folsom, CA (US); Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/196,832

(22) Filed: Jun. 29, 2016

(65) Prior Publication Data
US 2018/0004685 A1 Jan. 4, 2018

(51) Int. Cl.
| | | |
|---|---|---|
| G06F 13/10 | (2006.01) | |
| G06F 13/20 | (2006.01) | |
| G06F 13/40 | (2006.01) | |
| G06F 13/42 | (2006.01) | |

(52) U.S. Cl.
CPC ............ *G06F 13/102* (2013.01); *G06F 13/20* (2013.01); *G06F 13/4027* (2013.01); *G06F 13/4068* (2013.01); *G06F 13/4282* (2013.01); *G06F 2213/0042* (2013.01)

(58) Field of Classification Search
CPC ........ G06F 13/102; G06F 13/38; G06F 3/385; G06F 13/387
USPC .......................................................... 710/11
See application file for complete search history.

(56) References Cited

U.S. PATENT DOCUMENTS

| | | | | |
|---|---|---|---|---|
| 6,546,450 B1 * | 4/2003 | Liu | ..................... | G06F 13/4022 710/100 |
| 6,744,810 B1 * | 6/2004 | Iyer | ..................... | G06F 13/4045 375/214 |
| 2003/0163627 A1 * | 8/2003 | Deng | ................... | H03K 5/1252 710/305 |
| 2003/0204652 A1 * | 10/2003 | Saito | ................... | G06F 13/4081 710/33 |

(Continued)

FOREIGN PATENT DOCUMENTS

EP        1580648        9/2005

OTHER PUBLICATIONS

UTMI+ Specification, Revision 1.0, Feb. 25, 2014.*

(Continued)

*Primary Examiner* — Tim T Vo
*Assistant Examiner* — Phong H Dang
(74) *Attorney, Agent, or Firm* — Green, Howard, & Mughal LLP

(57) ABSTRACT

Described is a host interface, a device interface, a downstream translation circuitry, an upstream translation circuitry, and a host line-state state machine. The host interface may comprise a host line-state output. The device interface may comprise a device line-state output. The downstream translation circuitry may be operable to process a transaction received on the host interface and to generate a transaction for the device interface. The upstream translation circuitry may be operable to process a transaction received on the device interface and to generate a transaction for the host interface. The host line-state state machine may be operable to set the host line-state output to a value that is one of: an SE0-state value, a J-state value, or a K-state value.

19 Claims, 8 Drawing Sheets

(56) References Cited

U.S. PATENT DOCUMENTS

| | | |
|---|---|---|
| 2005/0033896 A1 | 2/2005 | Wang et al. |
| 2009/0070515 A1* | 3/2009 | So ...................... G06F 13/4027 710/311 |
| 2012/0185723 A1 | 7/2012 | Jaffar et al. |
| 2013/0191570 A1* | 7/2013 | Lee .................. H04N 21/43615 710/106 |
| 2016/0162427 A1* | 6/2016 | Kang .................... G06F 13/387 710/313 |
| 2016/0278142 A1* | 9/2016 | Babbage, II ............ H04L 25/00 |

OTHER PUBLICATIONS

UTMI+ Low Pin Interface (ULPI) Specification, Revision 1.1, Oct. 20, 2014.*

International Search Report and Written Opinion for International Patent Application No. PCT/US2017/034038, dated Aug. 28, 2017.

* cited by examiner

EFFICIENT LOW COST ON-DIE CONFIGURABLE BRIDGE CONTROLLER

BACKGROUND

Computer systems (e.g., desktop computers, laptop computers, workstations, and servers) commonly interact with a variety of peripheral devices. Some peripheral devices, such as keyboard, mice, and monitors, may facilitate routine use of computer systems. Computer systems may also interact with a plethora of other consumer devices, such as printers, scanners, speakers, microphones, cameras, projectors, smart phones, tablets, flash drives, and external hard drives. Interaction with peripheral devices may take place through interfaces based upon various interconnect technologies. Universal Serial Bus (USB) interfaces are used in a wide range of peripheral devices.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
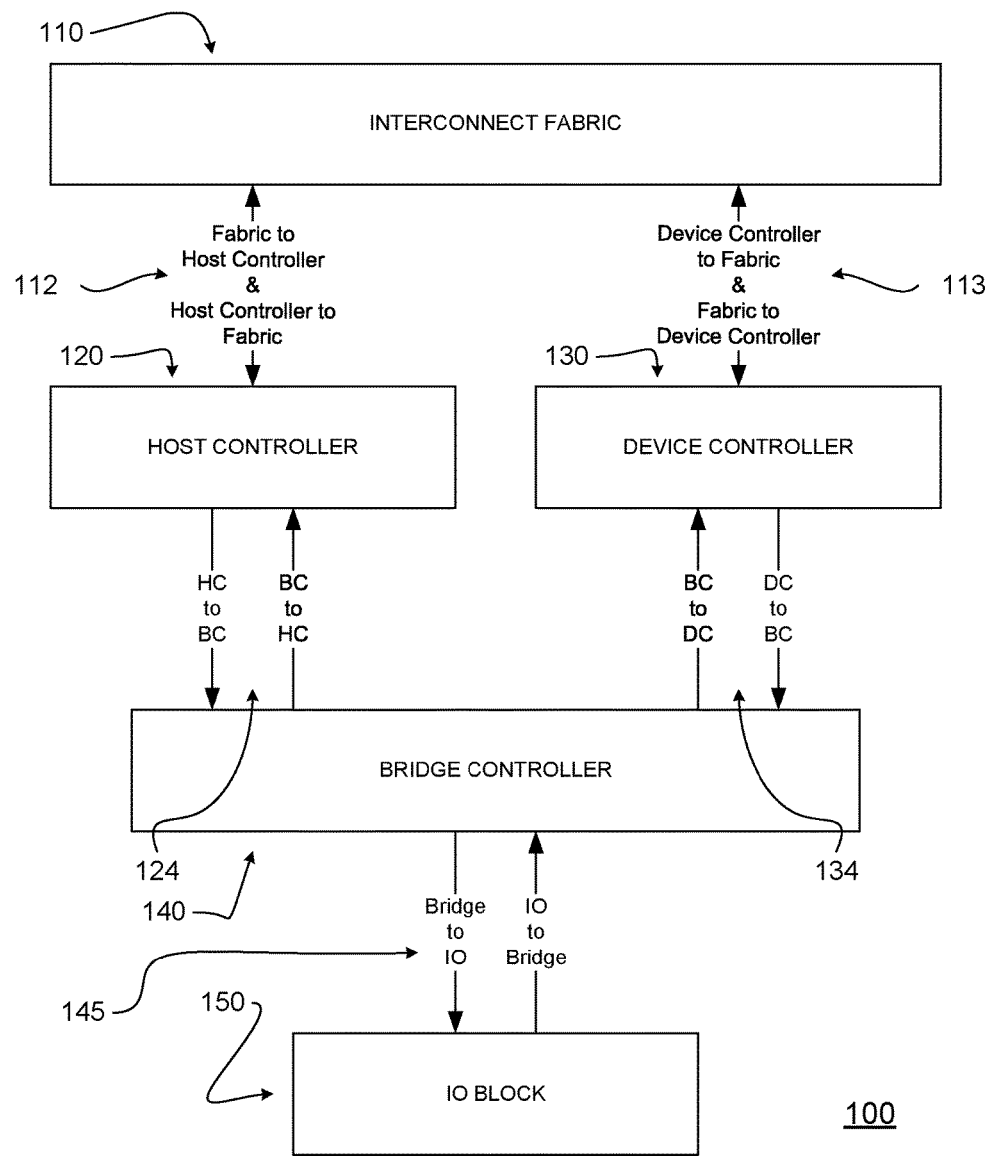
FIG. 1 illustrates a portion of a component for a computing device comprising a bridge controller, in accordance with some embodiments of the disclosure.

Computer systems (e.g., desktop computers, laptop computers, workstations, and servers) may interact through various interfaces with a variety of peripheral devices. Interfaces based upon revisions of the Universal Serial Bus (USB) specification are widely-used in peripheral devices.

USB host controllers may be integrated within components of computer systems to interact with USB-based peripheral devices. A USB host controller may communicate with a USB device controller over a USB, and the USB device controller may in turn be operable to communicate with other portions of a peripheral device.

A component of a computer system may accordingly communicate with a USB host controller, which may communicate with a USB device controller over a USB, which may then communicate with the remaining portions of a peripheral device (e.g., to carry out a function of the peripheral device). In this way, the USB connection may enable useful communication between the computer system and the peripheral device.

System-on-a-Chip (SoC) components and Internet-of-Things (IoT) components may incorporate USB host controllers and/or USB device controllers. Ensuring proper host and device communication may be important to ensure the quality of such components. The incorporation of USB host controllers into computer system components may, however, present challenges related to testing the components.

Silicon testers used for manufacturing and/or debug tend to be highly complex and highly expensive. Meanwhile, contemporary integrated components comprising one or more USB interfaces may also comprise one or more other interfaces. For example, a component may also comprise an interface associated with another interconnect technology, such as a Peripheral Component Interconnect (PCI) Express interface or an Intel Thunderbolt™ interface (Thunderbolt is a trademark of Intel Corporation or its subsidiaries in the U.S. and/or other countries).

However, some test interface units (TIUs) designed to couple silicon testers to the silicon components being tested may not have sufficient resources to monitor all interfaces simultaneously. Tests being run on the silicon testers may thus be limited to simultaneous testing of mere subsets of their interfaces at any one time.

For USB interfaces, external USB connectors and devices and may be used to assist in tests run on these silicon testers. Such equipment may be bulky and cumbersome, however, and the use of such equipment may add complexity and significant cost to the testing process. Moreover, limitations of such equipment may hinder or prevent full system-level testing of the silicon component.

Some interfaces may be placed into a "loopback" testing mode, in which outputs are routed or fed back to inputs. Depending upon the specific implementation, the circuitry involved in transmitting and receiving signals on the interface may be either partially covered by a loopback test (e.g., for an internal loopback testing mode), or entirely covered by a loopback test (e.g., for an external loopback testing mode). However, USB interfaces may be asymmetric, and may accordingly not be candidates for loopback testing.

Discussed herein are bridge controllers based on the USB 2.0 specification (issued Apr. 27, 2000) that may be incorporated into computing devices having host controllers and/or device controllers, according to some embodiments of the disclosure. In various embodiments, the bridge controllers may also be based upon one or more of: the Errata to the USB 2.0 specification as of Dec. 7, 2000; the Errata to the USB 2.0 specification as of May 28, 2002; the Inter-Chip USB Supplement Revision 1.0 (as of Mar. 13, 2006); the USB 2.0 Link Power Management Addendum Engineering Change Notice to the USB 2.0 specification as of Jul. 16, 2007; the High-Speed Inter-Chip USB Electrical Specification Revision 1.0 (as of Sep. 23, 2007); the USB TEST_MODE Selector Values ECN (as of Jul. 26, 2010); the Errata for USB 2.0 ECN: Link Power Management (LPM)-7/2007 (as of Oct. 11, 2011); the On-The-Go and Embedded Host Supplement to the USB Revision 2.0 Specification, Revision 2.0 version 1.1a (as of Jul. 27, 2012); the HSIC ECN as of May 21, 2012; and/or the Embedded USB2 (eUSB2) Physical Layer Supplement to the USB Revision 2.0 Specification (dated Aug. 1, 2014).

In some embodiments, a bridge controller is provided which may facilitate on-die communication between (a) a port of a host controller and a port of a device controller and/or (b) a port of a host controller and another port of a host controller. In the first case, for example, the bridge controller may intercept signals from the host controller, interpret them, and send appropriate signals to the device controller. In some embodiments, the bridge controller may intercept signals from the device controller, interpret them, and send appropriate signals to the host controller. In some embodiments, the bridge controller may accordingly act as device from the perspective of the host, and may act as a host from the perspective of the device. In some embodiments, the bridge controllers may be additionally configured to support three USB 2.0 speeds—Low Speed (LS), at approximately 1.5 megabits per second (Mb/s); Full Speed (FS), at approximately 12 Mb/s; and High Speed (HS), at approximately 480 Mb/s MHz.

In accordance with various embodiments, a bridge controller may bypass part or all of an Analog Front End (AFE) of a USB interface associated with a USB host controller or associated with a USB device controller, and may thereby bypass analog circuitry and may exist completely in a digital domain. Portions of the USB protocol that may ordinarily be performed by the AFE may instead be performed by the bridge controller.

The bridge controllers of various embodiments may present numerous advantages with respect to silicon testing. For example, by bypassing part or all of a USB interface AFE, and by facilitating communication between a host controller and another element on the same component (such as a device controller), silicon testing of large portions of a USB host controller (and/or device controller) may be undertaken without expensive USB connectors and devices external to a silicon tester TIU. The bridge controllers of some embodiments may thus reduce the cost of validation and production testing for a product family, potentially by many millions of dollars. The bridge controllers of some embodiments may support self-contained testing on a TIU, and may both speed up and enhance system-level testing of components at wafer sort (e.g., sort) and/or die classification (e.g., class). The resulting improvements in the screening of defective components may reduce the time taken to achieve defects-per-million (DPM) quality requirements, which may in turn reduce the time between tapeout and verifying the quality of the component for sale to customers (e.g., time to market).

In addition, bridge controllers of some embodiments may have advantages related to design flexibility and feature-sets. Since bridge controllers may provide an operational path between a host controller and a device controller, the bridge controllers of some embodiments may facilitate integration of various devices on the platform into a USB host-controller space. Moreover, the integration of such a device may permit the removal of the AFE and/or portions of an analog physical interface (PHY), which may save die area and/or power (and may also save design effort and/or validation effort related to the removed portions).

For example, bridge controllers may facilitate the integration of memory devices on the platform (such as flash memory, embedded MultiMedia Card (eMMC) memory, Universal Flash Storage (UFS) memory, etc.) into a component comprising a host controller, a device controller, and a bridge controller. A manufactured component with an integrated memory device may then be used when running an available USB software stack and/or USB infrastructure (such as USB drivers). For components in which both a device controller and memory are coupled to an interconnect fabric, traffic through a bridge controller may be routed to a memory region of interest, which may present a variety of opportunities for expanding memory spaces for USB devices.

As another example, a bridge controller coupled through a device controller to a security engine and/or a manageability engine may be used to validate new software (such as new USB software drivers) and/or new firmware. A bridge controller coupled to a security and manageability device may be used to provide a closed system or environment for secure validation. New drivers or new driver patches may be loaded, and a host controller and device controller may be verified as communicating properly, through the bridge controller, without needing additional external devices. New firmware may be run through a USB host stack and through the bridge controller to the security and manageability device to validate patches, and firmware integrity checks may be performed in a closed environment, without needing additional external devices.

Bridge controllers of some embodiments may have a relatively low-cost architecture that may be easily integrated into products. As a result, integration of USB bridge controllers into components may be a relatively quick and inexpensive way to integrate various USB-based devices into those components. While the embodiments are described with reference to USB 2.0 Specification, the embodiments are not limited to such. Other specifications, USB and non-USB, can embody the various embodiments described here.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 illustrates a portion of a component for a computing device comprising a bridge controller, in accordance with some embodiments of the disclosure. Component portion 100 may comprise an interconnect fabric 110, a host controller 120, a device controller 130, a bridge controller 140, and an input/output (IO) block 150. In some embodiments, interconnect fabric 110 may be coupled to a memory system. For some embodiments, interconnect fabric 110 may be coupled to other controllers.

Interconnect fabric 110 may be coupled by a fabric/host interface 112 to host controller 120. Fabric/host interface 112 may comprise one or more paths operable to carry signals sent from interconnect fabric 110 to host controller 120, and may comprise one or more paths operable to carry signals sent from host controller 120 to interconnect fabric 110. Fabric/host interface 112 may be operable to carry downstream traffic and/or transactions from interconnect fabric 110 to host controller 120, and may be operable to carry upstream traffic and/or transactions (e.g., responses to downstream traffic and/or transactions) from host controller 120 to interconnect fabric 110.

Interconnect fabric 110 may also be coupled by a device/fabric interface 113 to device controller 130. Device/fabric interface 113 may comprise one or more paths operable to carry signals sent from interconnect fabric 110 to device controller 130, and may comprise one or more paths operable to carry signals sent from device controller 130 to interconnect fabric 110. Device/fabric interface 113 may be operable to carry downstream traffic and/or transactions from device controller 130 to interconnect fabric 110, and may be operable to carry upstream traffic and/or transactions (e.g., responses to downstream traffic and/or transactions) from interconnect fabric 110 to device controller 130.

Host controller 120 may be coupled by a host/bridge interface 124 to bridge controller 140. Host/bridge interface 124 may comprise one or more paths operable to carry signals sent from host controller 120 to bridge controller 140, and may comprise one or more paths operable to carry signals sent from bridge controller 140 to host controller 120. Host/bridge interface 124 may be operable to carry downstream traffic and/or transactions from host controller 120 to bridge controller 140, and may be operable to carry upstream traffic and/or transactions (e.g., responses to downstream traffic and/or transactions) from bridge controller 140 to host controller 120. Host controller 120 may be a USB 2.0 host controller, and may be operable to generate downstream traffic and/or transactions in accordance with the USB 2.0 specification, and may be operable to process upstream traffic and/or transactions (e.g., responses to downstream traffic and/or transactions) in accordance with the USB 2.0 specification.

Device controller 130 may be coupled by a bridge/device interface 134 to bridge controller 140. Bridge/device interface 134 may comprise one or more paths operable to carry signals sent from bridge controller 140 to device controller 130, and may comprise one or more paths operable to carry signals sent from device controller 130 to bridge controller 140. Bridge/device interface 134 may be operable to carry downstream traffic and/or transactions from bridge controller 140 to device controller 130, and may be operable to carry upstream traffic and/or transactions (e.g., responses to downstream traffic and/or transactions) from device controller 130 to bridge controller 140. Device controller 130 may be a USB 2.0 device controller, and may be operable to process downstream traffic and/or transactions in accordance with the USB 2.0 specification, and may be operable to generate upstream traffic and/or transactions (e.g., responses to downstream traffic and/or transactions) in accordance with the USB 2.0 specification.

Bridge controller 140 may be coupled by a bridge/IO interface 145 to IO block 150. Bridge/IO interface 145 may comprise one or more paths operable to carry signals sent from bridge controller 140 to IO block 150, and may comprise one or more paths operable to carry signals sent from IO block 150 to bridge controller 140. Bridge/IO interface 145 may thereby be operable to carry downstream traffic and/or transactions from bridge controller 140 to IO block 150, and may be operable to carry upstream traffic and/or transactions (e.g., responses to downstream traffic and/or transactions) from IO block 150 to bridge controller 140.

In a first mode of operation, bridge controller 140 may be operable to establish a USB 2.0 compliant communication link between host controller 120 and a device coupled to IO block 150 (e.g., over a USB 2.0 connection external to the component, which may itself be coupled to a USB 2.0 device controller on a separate component such as a peripheral device). Bridge controller 140 may operate in the first mode to establish a USB link between the component and a peripheral device, for example.

In a second mode of operation, bridge controller 140 may be operable to establish a USB 2.0 compliant communication link between host controller 120 and device controller 130. In the second mode, bridge controller 140 may carry downstream traffic and/or transactions from host controller 120 to device controller 130, and may carry upstream traffic and/or transactions from device controller 130 to host controller 120. Bridge controller 140 may also be operable to perform handshakes with host controller 120 that otherwise would be performed by an AFE circuitry and/or PHY circuitry for a USB host controller. Similarly, bridge controller 140 may be operable to perform handshakes with device controller 130 that otherwise would be performed by an AFE circuitry and/or PHY circuitry for a USB device controller. In the second mode of operation, bridge controller 140 may quiet an AFE circuitry and/or PHY circuitry associated with IO block 150.

Bridge controller 140 may operate in the second mode as part of a testing mode in which formation of a USB 2.0 communication link between host controller 120 and device controller 130 may facilitate silicon testing without requiring the formation of a USB 2.0 communication link through IO bridge 150. Bridge controller 140 may also operate in the second mode as part of a functional operating mode in which device controller 130 is coupled to a device (such as a memory device, a security device, or a manageability device), in order to enable USB 2.0 based access to a USB device integrated into the component.

Figure 2:
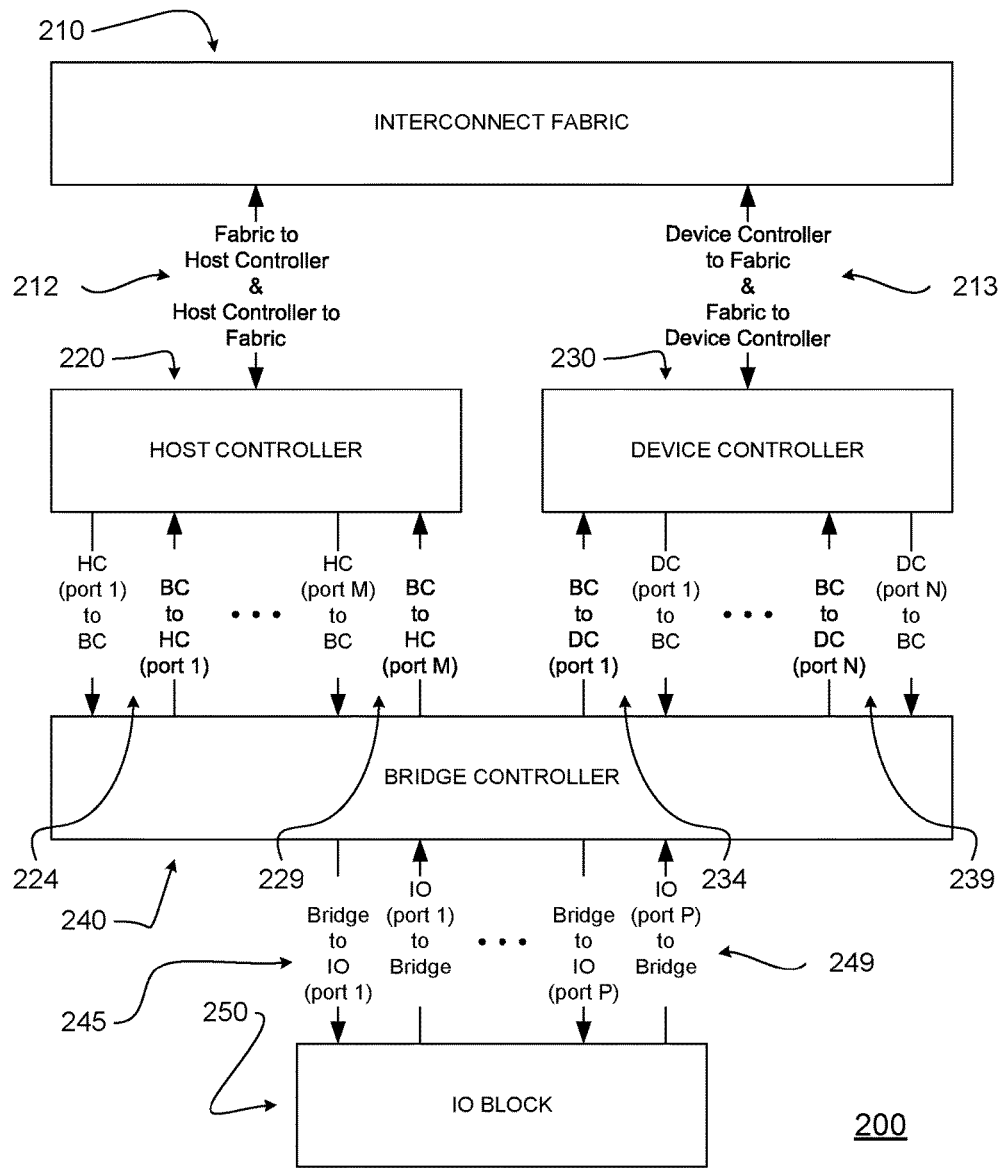
FIG. 2 illustrates a portion of a component for a computing device comprising a bridge controller, in accordance with some embodiments of the disclosure.

FIG. 2 illustrates a portion of a component for a computing device comprising a bridge controller, in accordance with some embodiments of the disclosure. Component portion 200 may comprise an interconnect fabric 210, a host controller 220, a device controller 230, a bridge controller 240, and an IO block 250. In some embodiments, interconnect fabric 210 may be coupled to a memory system. For some embodiments, interconnect fabric 210 may be coupled to other controllers.

In a manner substantially similar to component portion 100, interconnect fabric 210 may be coupled by a fabric/host interface 212 to host controller 220, and interconnect fabric 210 may be coupled by a device/fabric interface 213 to device controller 230. Interconnect fabric 210 may be substantially similar to interconnect fabric 110 of component portion 100 in FIG. 1.

However, in contrast with component portion 100, host controller 220 may have more than one port, and may accordingly be coupled to bridge controller 240 by more than one host/bridge interface. Each host/bridge interface may be substantially similar to host/bridge interface 124 of component portion 100. For example, host controller 220 may have a first port ("port 1") coupled by a host/bridge interface 224 to bridge controller 240, and may have one or more additional ports coupled by separate host/bridge interfaces to bridge controller 240, for a total of M ports, with the last port ("port M") being coupled by a host/bridge interface 229 to bridge controller 240.

Device controller 230 may have more than one port, and may be coupled to bridge controller 240 by more than one bridge/device interface. Each bridge/device interface may be substantially similar to bridge/device interface 134 of component portion 100. For example, device controller 230 may have a first port ("port 1") coupled by a bridge/device 234 to bridge controller 240, and may have one or more additional ports coupled by separate bridge/device interfaces to bridge controller 240, for a total of N ports, with the last port ("port N") being coupled by a bridge/device interface 239 to bridge controller 240.

Each port of host controller 220 may be operable to generate downstream traffic and/or transactions in accordance with the USB 2.0 specification, and may be able to process upstream traffic and/or transactions (e.g., responses to downstream traffic and/or transactions) in accordance with the USB 2.0 specification. Similarly, each port of device controller 230 may be operable to process downstream traffic and/or transactions in accordance with the USB 2.0 specification, and may be operable to generate upstream traffic and/or transactions (e.g., responses to downstream traffic and/or transactions) in accordance with the USB 2.0 specification.

IO block 250 may also have more than one ports operable to serve more than one USB 2.0 communication link, and may accordingly be coupled to bridge controller 240 by more than one bridge/IO interface. Each bridge/IO interface may be substantially similar to bridge/IO interface 145 of component portion 100. For example, IO block 250 may have a first port ("port 1") coupled by a bridge/IO interface 245 to bridge controller 240, and may have one or more additional ports coupled by separate bridge/IO interfaces to bridge controller 240, for a total of P ports, with the last port ("port P") being coupled by a bridge/IO interface 249 to bridge controller 240.

Bridge controller 240 may have a first mode of operation and a second mode of operation similar to the first mode of operation and second mode of operation of bridge controller 140 of component portion 100. Moreover, bridge controller 240 may contain one or more routing circuitries operable to route traffic and/or transactions between any of the M ports of host controller 220 and any of the N ports of device controller 230, and/or between any of the M ports of host controller 220 and any of the P ports of IO block 250.

Accordingly, in the first mode of operation, bridge controller 240 may be operable to establish a USB 2.0 compliant communication link between any of the M ports of host controller 220 and a device coupled to any of the P ports of IO block 250. Bridge controller 240 may operate in this first mode, for example, to establish a USB link between the component and a peripheral device.

Similarly, in the second mode of operation, bridge controller 240 may be operable to establish a USB 2.0 compliant communication link between any of the M ports of host controller 220 and any of the N ports of device controller 230. Bridge controller 240 may operate in this second mode, for example, as part of a testing mode to facilitate silicon testing, or as part of a functional operating mode to enable USB 2.0 based access to a USB device integrated into the component.

Bridge controller 240 may also have a third mode of operation. In the third mode, bridge controller 240 may be operable to establish a USB 2.0 compliant communication link between any of the M ports of host controller 220 and another port of host controller 220.

It should be noted that for embodiments in which bridge controller 240 interfaces with more than one host controller port, host controller 220 may be implemented as a plurality of host controllers, each of which may have one or more ports. Similarly, for embodiments in which bridge controller 240 interfaces with more than one device controller port, device controller 230 may be implemented as a plurality of device controllers, each of which may have one or more ports. For embodiments in which bridge controller 240 interfaces with more than one IO block port, IO block 250 may be implemented as a plurality of IO blocks, each of which may have one or more ports. Meanwhile, component portion 200 may have multiple bridge controllers interfacing with various ports of host controller 220, device controller 230, and/or IO block 250.

Figure 3:
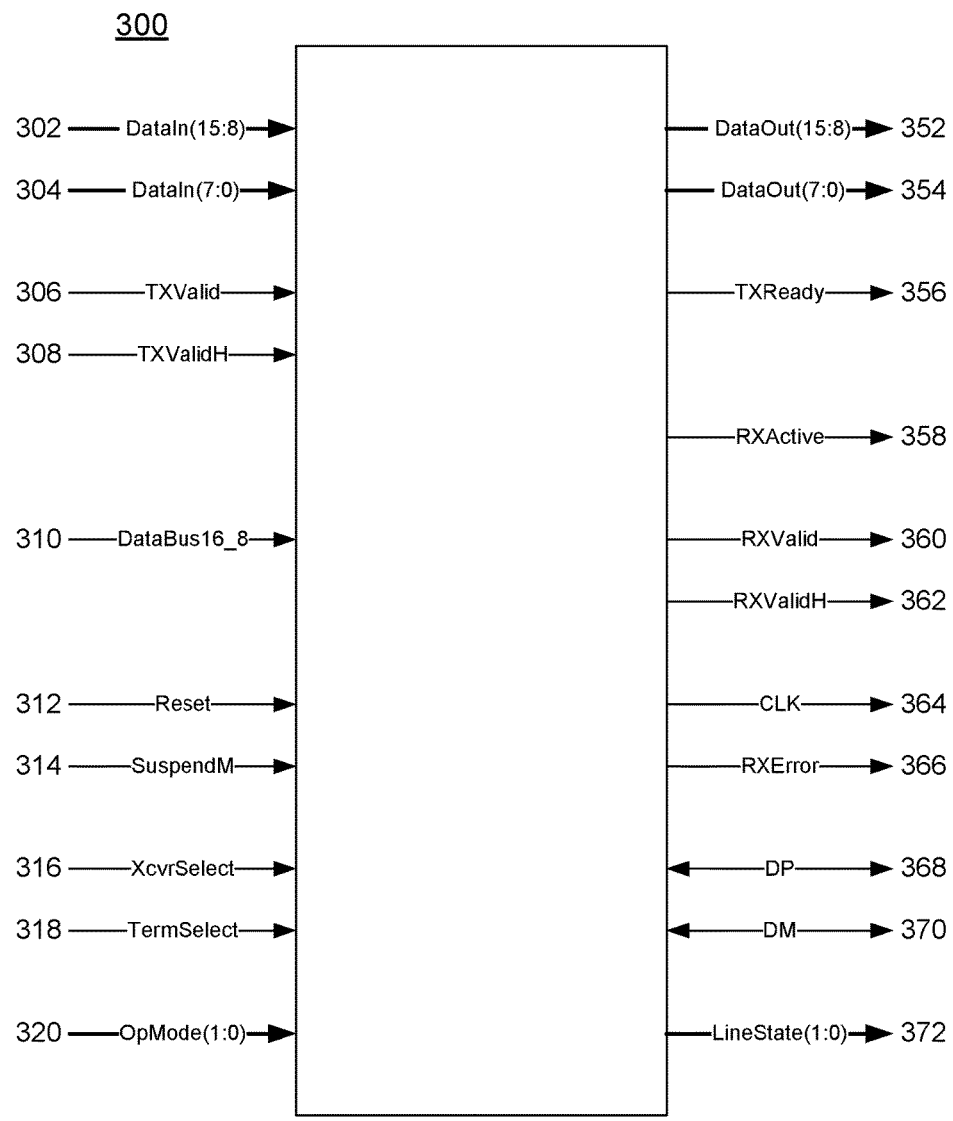
FIG. 3 illustrates inputs and outputs for a Universal Serial Bus (USB) Transceiver Macrocell Interface (UTMI) interface, in accordance with some embodiments of the disclosure.

One or more of the host/bridge interfaces and/or bridge/device interfaces of component portion 100 and/or component portion 200 may comprise inputs and/or outputs for a USB Transceiver Macrocell Interface (UTMI) interface. FIG. 3 illustrates inputs and outputs for a UTMI interface, in accordance with some embodiments of the disclosure. A bridge controller (e.g., bridge controller 140 or bridge controller 240) may be coupled to a host/bridge interface (e.g., host/bridge interface 124 or host/bridge interface 224) or a bridge/device interface (e.g., bridge/device interface 134 or bridge/device interface 234) by signal paths for various inputs and/or outputs compliant with Revision 1.0 of the UTMI+ Specification (issued Feb. 25, 2004). For example, both a host/bridge interface and a bridge/device interface may comprise signal paths for a set of interface signals for a UTMI+ level 0 entity (as defined by Revision 1.0 of the UTMI+ Specification).

A bridge controller may accordingly comprise signal paths for one or more UTMI-compliant inputs, such as an 8-bit DataIn(15:8) input 302, an 8-bit DataIn(7:0) input 304, a TXValid input 306, a TXValidH input 308, a DataBus16_8 input 310, a Reset input 312, a SuspendM input 314, an XcvrSelect input 316, a TermSelect input 318, and a 2-bit OpMode input 320. For example, a host/bridge interface may carry a set of UTMI-compliant inputs from a host controller (e.g., host controller 120 or host controller 220) to a bridge controller (e.g., bridge controller 140 or bridge controller 240). A bridge/device interface may also carry a set of UTMI-compliant inputs from a device controller (e.g., device controller 130 or device controller 230) to a bridge controller (e.g., bridge controller 140 or bridge controller 240).

A bridge controller may comprise signal paths for one or more UTMI-compliant outputs, such as an 8-bit DataOut (15:8) output 352, an 8-bit DataOut(7:0) output 354, a TXReady output 356, an RXActive output 358, an RXValid output 360, an RXValidH output 362, a CLK output 364, an RXError output 366, and a 2-bit LineState(1:0) output 372. A host/bridge interface may carry a set of UTMI-compliant outputs from a bridge controller (e.g., bridge controller 140 or bridge controller 240) to a host controller (e.g., host controller 120 or host controller 220). A bridge/device interface may also carry a set of UTMI-compliant outputs from a bridge controller (e.g., bridge controller 140 or bridge controller 240) to a device controller (e.g., device controller 130 or device controller 230).

A host/bridge interface of a bridge controller, and/or a bridge/device interface of a bridge controller, may also comprise signal paths for one or more additional UTMI-compliant signals, such as a DP signal 368 and a DM signal 370 (which may correspond respectively with a DP pull-up resistor or a DM pull-down resistor).

Figure 4:
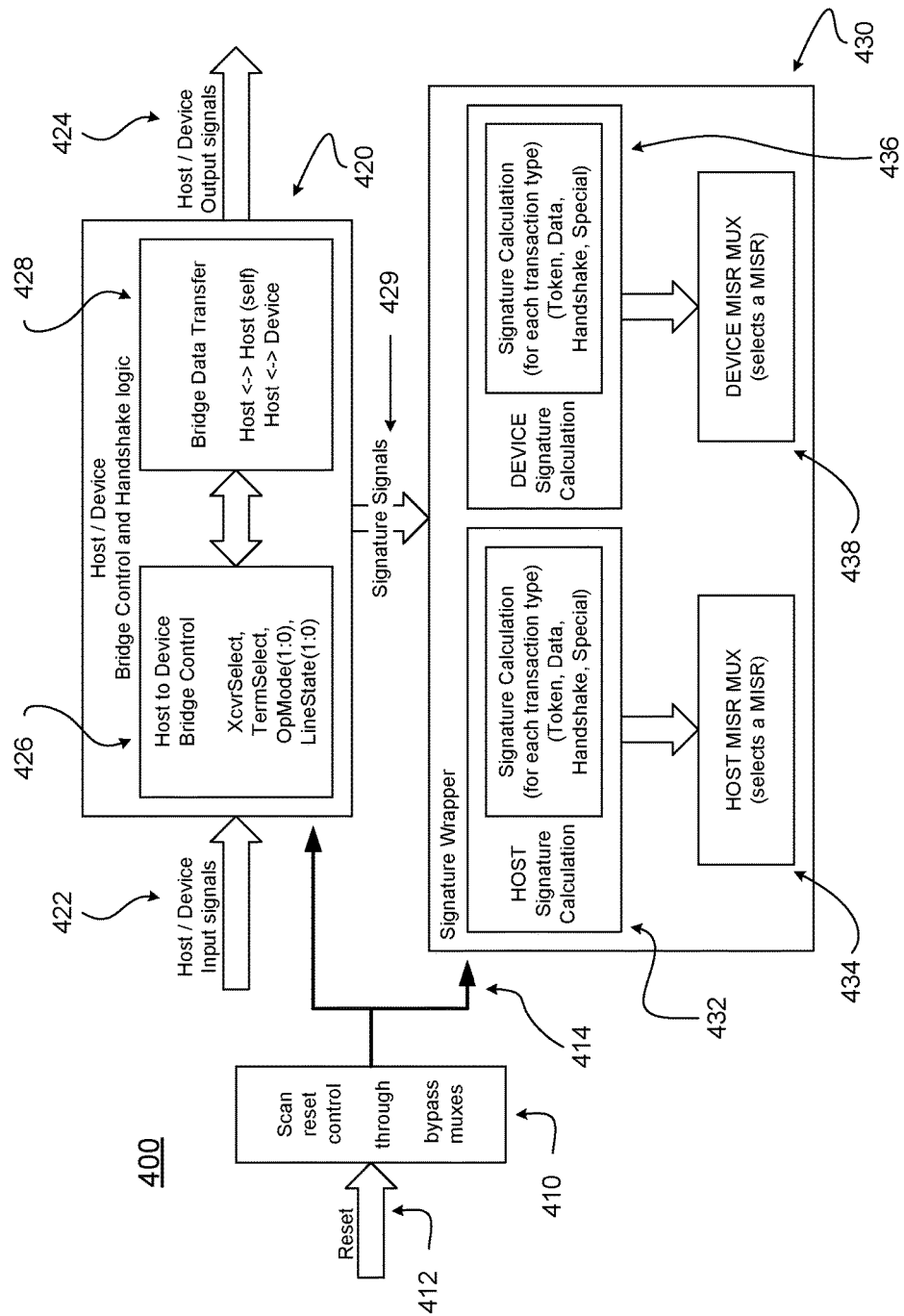
FIG. 4 illustrates a control, handshake, data transfer, and signature collection framework for a bridge controller, in accordance with some embodiments of the disclosure.

FIG. 4 illustrates a control, handshake, data transfer, and signature collection framework for a bridge controller of a component, in accordance with some embodiments of the disclosure. A bridge controller framework 400 may comprise a scan portion 410, an operational mode portion 420, and a test mode portion 430. Scan portion 410 may comprise a signal path for a reset input 412 and one or more signal paths for a scan interface 414. In some embodiments, scan interface 414 may comprise one or more reset signals that may be asserted by scan portion 410 upon an assertion of reset input 412.

In some embodiments, scan interface 414 may comprise one or more signals for scan chain operation, such as a scan-mode enable, one or more scan-chain inputs, and/or a scan-mode clock. For some such embodiments, scan portion 410 may be operable to assert one or more signals of scan interface 414 to load one or more scan chains for fault testing. For some embodiments, scan interface 414 may comprise one or more signals for boundary scan operation compliant with Institute of Electrical and Electronics Engineers (IEEE) standard 1149.1-1990 (standardized in 1990) and/or IEEE standard 1149.1-2013 (published May 13, 2013) developed by the Joint Test Action Group (JTAG). For example, scan interface 414 may comprise one or more of a Test Clock (TCK) signal, a Test Mode Select (TMS) signal, a Test Data In (TDI) signal, and/or a Test Reset (TRST) signal. For some such embodiments, scan portion 410 may be operable to assert one or more signals of scan interface 414 to exercise one or more Test Access Ports (TAPs) for various testing purposes.

Operational mode portion 420 may comprise a set of host/device input signals 422, a set of host/device output signals 424, a bridge control circuitry 426, a bridge data transfer circuitry 428, and a set of signature signals 429. Host/device input signals 422 may comprise signals carried from a host controller to a bridge controller as well as signals carried from a device controller to the bridge controller. Host/device input signals 422 may accordingly include one or more sets of UTMI-compliant inputs carried from a host controller to a bridge controller, and may include one or more sets of UTMI-compliant inputs carried from a device controller to the bridge controller.

Similarly, host/device output signals 424 may comprise signals carried from the bridge controller to the host controller as well as signals carried from the bridge controller to the device controller. Host/device output signals 424 may accordingly include one or more sets of UTMI-compliant outputs carried from the bridge controller to the host controller, and may include one or more sets of UTMI-compliant outputs carried from the bridge controller to the device controller.

A bridge controller may comprehend one or more protocols between a host controller, a device controller, and/or an AFE circuitry. In at least one mode of operation, the bridge controller may process inputs from the host controller and the device controller and may generate outputs for the host controller and the device controller in order to establish a USB 2.0 communication link between the host controller and the device controller. The bridge controller may bypass an AFE circuitry and may emulate a PHY circuitry by conducting one or more PHY handshake protocols with both the host controller and the device controller.

For example, bridge control circuitry 426 may process one or more UTMI-compliant inputs (e.g., a DataIn(7:0) input, a TxValid input, an XcvrSelect input, a TermSelect input, and/or an OpMode input) carried from the host controller and/or the device controller. Bridge control circuitry 426 may also generate one or more UTMI-compliant outputs (e.g., a LineState output) carried to the host controller and/or the device controller. Bridge control circuitry 426 may thereby facilitate a handshake protocol between the host controller and the device controller to establish a USB 2.0 communication link while bypassing AFE circuitry and/or PHY circuitry. Bridge control circuitry 426 may also enable a USB 2.0 chirp sequence between the host controller and the device controller to negotiate a speed (e.g., Low Speed, Full Speed, or High Speed) for the USB 2.0 communication link (while bypassing AFE circuitry and/or PHY circuitry).

Once a USB 2.0 communication link has been established, bridge data transfer circuitry 428 may then process downstream traffic and/or transactions carried on a host/bridge interface, translate the traffic and/or transactions, and generate corresponding downstream traffic and/or transactions carried on a bridge/device interface. Similarly, bridge data transfer circuitry 428 may process upstream traffic and/or transactions carried on the bridge/device interface, translate the traffic and/or transactions, and generate corresponding upstream traffic and/or transactions carried on the host/bridge interface. The traffic and/or transactions may be processed and generated at a speed negotiated with the assistance of bridge control circuitry 426.

To a device controller, downstream traffic and/or transactions on the bridge/device interface may appear to have been generated by a host controller on the other end of a conventional USB 2.0 communication link. To a host controller, upstream traffic and/or transactions on the host/bridge interface may appear to have been generated by a device controller on the other end of a conventional USB 2.0 communication link.

In another mode of operation, bridge data transfer circuitry 428 may process inputs from a first host controller port and a second host controller port, and may generate corresponding outputs for the second host controller port and the first host controller port, respectively. Bridge data transfer circuitry 428 may thus route traffic and/or transactions from the first host controller port to the second host controller port, and may route traffic and/or transactions from the second host controller port to the first host controller port.

For testing purposes, one or more inputs, outputs, or internal signals of operational mode portion 420 may be carried by signature signals 429 to test mode portion 430. Signature signals 429 may comprise one or more UTMI-compliant input signals of host/device input signals 422, for example, and/or one or more UTMI-compliant output signals of host/device output signals 424. Internal signals that may be carried by signature signals 429 may include signals indicating the processing of a packet from a host port and/or device port, and/or signals indicating the generation of a packet to a device port and/or a host port. Such internal signals may also include one or more signals indicating the type of packet being processed (e.g., token, data, handshake, or special).

One or more of the inputs, outputs, and/or internal signals carried by signature signals 429 may be grouped as corresponding to a host controller (or host controller port) and/or as corresponding to a device controller (or device controller port). For embodiments comprising more than one host controller port and/or more than one device controller port, one or more of the inputs, outputs, and/or internal signals carried by signature signals 429 may be grouped as corresponding to specific host controller ports and/or specific device controller ports.

Test mode portion 430 may comprise a host signature calculation circuitry 432 and a host Multiple Input Shift Register (MISR) multiplexor 434. Host signature calculation circuitry 432 may process one or more signals of signature signals 429 corresponding to a host controller and/or one or more host controller ports. On the basis of those signals, host signature calculation circuitry 432 may calculate one or more host-related signatures, which may correspond to one or more packet types (e.g., token, data, handshake, or special). Host signature calculation circuitry 432 may then provide the one or more host-related signatures to host MISR multiplexor 434. Host signature calculation circuitry 432 may also provide one or more MISR selection indicators (which may correspond respectively to the one or more host-related signatures) to host MISR multiplexor 434. Host MISR multiplexor 434 may comprise, or may be coupled to, one or more MISR registers for storing signatures.

Similarly, test mode portion 430 may comprise a device signature calculation circuitry 436 and a host Multiple Input Shift Register (MISR) multiplexor 438. Device signature calculation circuitry 436 may process one or more signals of signature signals 429 corresponding to a device controller and/or one or more device controller ports. On the basis of those signals, device signature calculation circuitry 436 may calculate one or more device-related signatures, which may correspond to one or more packet types (e.g., token, data, handshake, or special). Device signature calculation circuitry 436 may then provide the one or more device-related signatures to device MISR multiplexor 438. Device signature calculation circuitry 436 may also provide one or more MISR selection indicators (which may correspond respectively to the one or more device-related signatures) to device MISR multiplexor 438. Device MISR multiplexor 438 may comprise, or may be coupled to, one or more MISR registers for storing signatures.

Accordingly, for both host controllers (and/or ports) and device controllers (and/or ports), various indicators pertaining to control and/or data traffic may be passed from operational mode portion 420 to test mode portion 430, which may then calculate one or more signatures to be provided to one or more MISR registers. The MISR registers may have next-values that are a function of the signatures and the previous values of the MISR registers. The contents of the one or more MISR registers may thereafter be a function of the entire history of traffic passing through the bridge controller.

In some embodiments, host MISR multiplexor 434 and/or device MISR multiplexor 438 may be coupled to one or more signals for boundary scan operation of scan interface 414. A simulation may then be run, and the contents of the MISR registers may be read out (e.g., by a boundary scan or JTAG read operation) in such a way that the results may be observed on an interface external to the component. The stimulus applied to the component in the simulation, and the response observed, may be captured and converted into a test that may be loaded and run on a silicon tester. The signatures calculated and accumulated in the MISR registers in the simulation may then be compared against silicon performance to test for proper component behavior.

Figure 5:
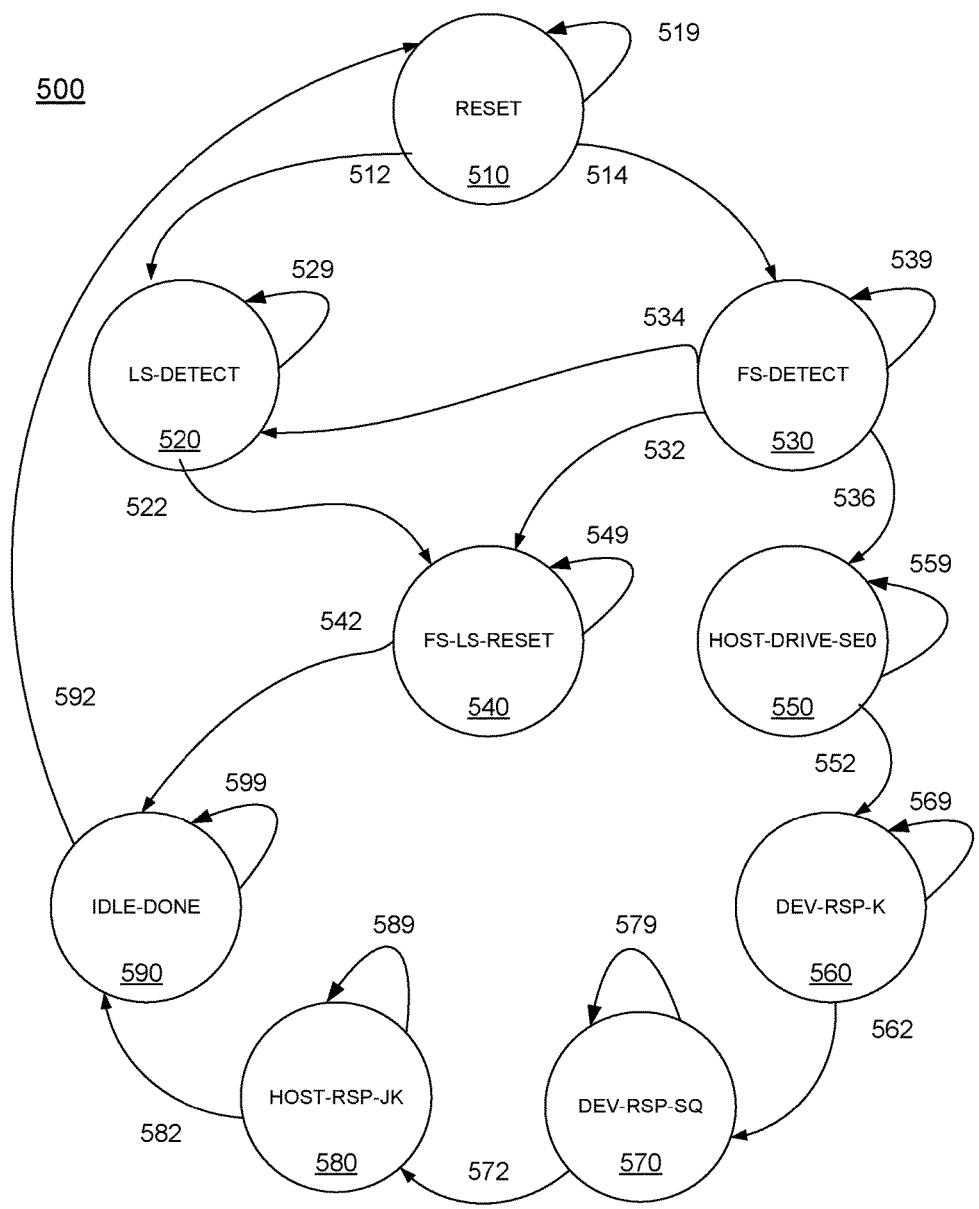
FIG. 5 illustrates a state machine for generating a LineState signal for a UTMI interface, in accordance with some embodiments of the disclosure.

FIG. 5 illustrates a state machine for generating a LineState signal for a UTMI interface, in accordance with some embodiments of the disclosure. A bridge controller may comprise a line-state state machine 500, which may process various inputs from a host/bridge interface and inputs from a bridge/device interface to establish a next-state and to determine a value to assert on a line-state output. Line-state state machine 500 may have one or more of the following plurality of line-state states: a reset state 510, a low-speed-detect state 520, a full-speed-detect state 530, a full-speed-low-speed-reset state 540, a host-drive-SE0 state 550, a device-response-K state 560, a device-response-SQ state 570, a host-response-JK state 580, and an idle-done state 590.

Line-state state machine 500 may process general inputs including a reset input and a speed-mode input. The speed-mode input may be operable to have a low-speed value, a full-speed value, or a high-speed value.

Line-state state machine 500 may also process various inputs carried by a host/bridge interface, such as a host data input (e.g., an 8-bit DataIn(7:0) input), a host transmit-valid input (e.g., a TxValid input), a host transceiver-select input (e.g., an XcvrSelect input), a host termination-select input (e.g., a TermSelect input), and a host op-mode input (e.g., a 2-bit OpMode input). Line-state state machine 500 may also process various inputs carried by a bridge/device interface, such as a device data input (e.g., an 8-bit DataIn(7:0) input), a device transmit-valid input (e.g., a TxValid input), a device transceiver-select input (e.g., an XcvrSelect input), a device termination-select input (e.g., a TermSelect input), and a device op-mode input (e.g., a 2-bit OpMode input).

The host transceiver-select input and/or device transceiver-select input may be operable to have a high-speed transceiver value (e.g., "00"), a full-speed transceiver value (e.g., "01"), or a low-speed transceiver value (e.g., "10"). The host op-mode input and/or device op-mode input may be operable to have a normal operation value (e.g., "00"), a non-driving value (e.g., "01"), a disable value (e.g., "10"), or a normal-operation-without-automatic-generation value (e.g., "11").

Line-state state machine 500 may determine a value to assert on a line-state output for the host/bridge interface (e.g., a 2-bit LineState(1:0) output) and/or a line-state output for the bridge/device interface (e.g., a 2-bit LineState(1:0) output). The host line-state output and/or device line-state output may be operable to have a single-ended-zero-state (SE0-state) value, a J-state value, or a K-state value.

Line-state state machine 500 may establish values to assert on the line-state output for the host/bridge interface and/or the line-state output for the bridge/device interface based upon the current line-state state of line-state state machine 500 and various inputs to line-state state machine 500. Similarly, line-state state machine 500 may establish next line-state state values based upon the current line-state state of line-state state machine 500 and various inputs to line-state state machine 500.

Line-state state machine 500 may establish one or more line-state output values in accordance with Table 1 below. Line-state state machine 500 may thereby provide a host controller and/or a device controller with a line-state output that would otherwise be generated by an AFE circuitry and/or a PHY circuitry. In bypassing the AFE circuitry and/or the PHY circuitry, line-state state machine 500 may advantageously replace what an AFE circuitry and/or PHY circuitry may otherwise need to do.

TABLE 1

Line-state state machine line-state output

| current line-state state | input conditions | line-state output |
|---|---|---|
| reset state 510 | (speed-mode == low-speed) | J-state |
| reset state 510 | else | K-state |
| low-speed-detect state 520 | (N/A) | K-state |
| full-speed-detect state 530 | (N/A) | J-state |
| full-speed-low-speed-reset state 540 | (N/A) | SE0-state |
| host-drive-SE0 state 550 | (N/A) | SE0-state |
| device-response-K state 560 | (N/A) | K-state |
| device-response-SQ state 570 | (N/A) | SE0-state |
| host-response-JK state 580 | (host op-mode == disable) AND | K-state |

TABLE 1-continued

Line-state state machine line-state output

| current line-state state | input conditions | line-state output |
|---|---|---|
| | (host transmit-valid == asserted) AND (host data == zero) | |
| host-response-JK state 580 | else | J-state |
| idle-done state 590 | (N/A) | SE0-state |

In some embodiments, the host line-state output and the device line-state output may be the same signal.

Line-state state machine 500 may also establish one or more next line-state states, via various state transitions, in accordance with Table 2 below. In the process, line-state state machine 500 may assist a host controller and a device controller to negotiate entrance into a High Speed USB 2.0 mode.

TABLE 2

Line-state state machine next line-state states

| current line-state state | input conditions | state transition | next line-state state |
|---|---|---|---|
| reset state 510 | (speed-mode == low-speed) | 512 | low-speed-detect state 520 |
| reset state 510 | (speed-mode == full-speed) OR (speed-mode == high-speed) | 514 | full-speed-detect state 530 |
| reset state 510 | else | 519 | reset state 510 |
| low-speed-detect state 520 | (host termination-select == de-asserted) | 522 | full-speed-low-speed-reset state 540 |
| low-speed-detect state 520 | else | 529 | low-speed-detect state 520 |
| full-speed-detect state 530 | (speed-mode == full-speed) AND (host termination-select == de-asserted) | 532 | full-speed-low-speed-reset state 540 |
| full-speed-detect state 530 | (device transceiver-select == low-speed transceiver) | 534 | low-speed-detect state 520 |
| full-speed-detect state 530 | (speed-mode == high-speed) AND (host op-mode == disable) AND (host transceiver-select == high-speed transceiver) AND (host termination-select == de-asserted) AND (device transceiver-select == full-speed transceiver) AND (device termination-select == asserted) | 536 | host-drive-SE0 state 550 |
| full-speed-detect state 530 | else | 539 | full-speed-detect state 530 |
| full-speed-low-speed-reset state 540 | (host termination-select == asserted) | 542 | idle-done state 590 |
| full-speed-low-speed-reset state 540 | else | 549 | full-speed-low-speed-reset state 540 |
| host-drive-SE0 state 550 | (device transceiver-select == high-speed transceiver) AND (device op-mode == disable) AND (device transmit- | 552 | device-response-K state 560 |

TABLE 2-continued

Line-state state machine next line-state states

| current line-state state | input conditions | state transition | next line-state state |
|---|---|---|---|
| host-drive-SE0 state 550 | valid == asserted) else | 559 | host-drive-SE0 state 550 |
| device-response-K state 560 | (device transmit-valid == de-asserted) | 562 | device-response-SQ state 570 |
| device-response-K state 560 | else | 569 | device-response-K state 560 |
| device-response-SQ state 570 | (single-cycle state - may transition to next state on any input conditions) | 572 | host-response-JK state 580 |
| device-response-SQ state 570 | else | 579 | device-response-SQ state 570 |
| host-response-JK state 580 | (device op-mode == normal) AND (device termination-select == de-asserted) AND (host transmit-valid == de-asserted) | 582 | idle-done state 590 |
| host-response-JK state 580 | else | 589 | host-response-JK state 580 |
| idle-done state 590 | (reset == asserted) | 592 | reset state 510 |
| idle-done state 590 | else | 599 | idle-done state 590 |

In some embodiments, a bridge controller may comprise other state machines for generating other UTMI-compliant outputs (e.g., TxReady and/or RXActive).

Figure 6:
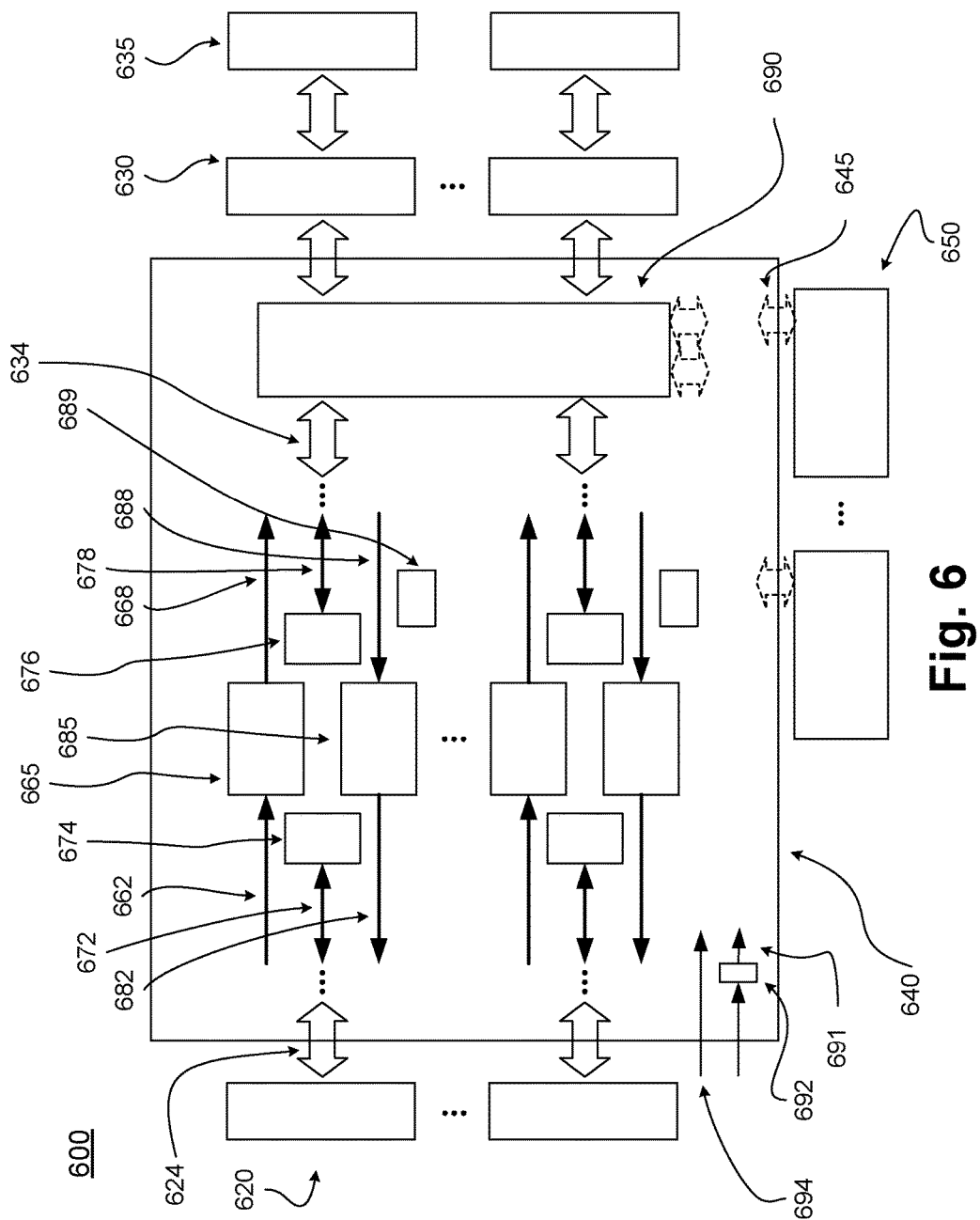
FIG. 6 illustrates a portion of a component for a computing device comprising a bridge controller, in accordance with some embodiments of the disclosure.

FIG. 6 illustrates a portion of a component for a computing device comprising a bridge controller, in accordance with some embodiments of the disclosure. Component portion 600 may comprise one or more host controllers 620, one or more device controllers 630, a bridge controller 640, and one or more IO blocks 650. Component portion 600 may also comprise one or more USB devices 635 coupled respectively to the one or more device controllers 630.

Bridge controller 640 may be respectively coupled to the one or more host controllers 620 through one or more host interfaces 624 (which may be substantially similar to host/bridge interface 124 and/or host/bridge interface 224). Bridge controller 640 may also be respectively coupled to the one or more device controllers 630 through one or more device interfaces 634 (which may be substantially similar to bridge/device interface 124 and/or bridge/device interfaces 234). In addition, bridge controller 640 may be respectively coupled to the one or more IO bridges 650 through one or more IO interfaces 645.

A host interface 624 may comprise a downstream host data interface 662 and an upstream host data interface 682. A device interface 634 may comprise control a downstream device data interface 668 and an upstream device data interface 688. In addition, bridge controller 640 may comprise a downstream translation circuitry 665 and an upstream translation circuitry 685. Downstream translation circuitry 665 may be operable to process a transaction received on downstream host data interface 662 (e.g., from host interface 624) and to generate a transaction (e.g., a translated transaction) for downstream device data interface 668 (e.g., to device interface 634). Similarly, upstream translation circuitry 685 may be operable to process a transaction received on upstream device data interface 688 (e.g., from device interface 634) and to generate a transaction (e.g., a translated transaction) for upstream host data interface 682 (e.g., to host interface 624).

Bridge controller 640 may also comprise a host control interface 672, a host control circuitry 674, a device control interface 678, and a device control circuitry 676. Host control circuitry 674 may process input signals received on host control interface 672 (e.g., from host interface 624) and/or generate output signals for host control interface 672 (e.g., to host interface 624). Host control circuitry 674 may comprise one or more state machines operable to process one or more input signals from host control interface 672 (and/or device control interface 678) and generate one or more output signals for host control interface 672. For example, host control circuitry 674 may comprise a host line-state state machine (which may be substantially similar to line-state state machine 500) for generating a LineState (1:0) output. Host control circuitry 674 may similarly comprise a host transmit-ready state machine for generating a TxReady output and/or a host receive-active state machine for generating an RXActive output.

Similarly, device control circuitry 676 may process input signals received on device control interface 678 (e.g., from device interface 634) and/or generate output signals for device control interface 678 (e.g., to device interface 634). Device control circuitry 676 may comprise one or more state machines operable to process one or more input signals from device control interface 678 (and/or host control interface 672) and generate one or more output signals for device control interface 678. For example, device control circuitry 676 may comprise a host line-state state machine (which may be substantially similar to line-state state machine 500) for generating a LineState(1:0) output. Device control circuitry 676 may similarly comprise a host transmit-ready state machine for generating a TxReady output and/or a host receive-active state machine for generating an RXActive output.

In some embodiments, a line-state state machine in either host control circuitry 674 or device control circuitry 676 may process one or more input signals from host control interface 672 and one or more input signals from device control interface 678, and may generate a line-state output for both host control interface 672 and device control interface 678.

Bridge controller 640 may additionally comprise a routing circuitry 690 and an IO selection input 691. In a first mode of operation, IO selection input 691 may be asserted, and routing circuitry 690 may be operable to establish a USB 2.0 compliant communication link between a host controller 620 and an IO block 650 (e.g., through a host/bridge interface 624 and a bridge/IO interface 645). In a second mode of operation, IO selection input 691 may be deasserted, and routing circuitry 690 may be operable to establish a USB 2.0 compliant communication link between a host controller 620 and a device controller 630 (e.g., through a host/bridge interface 624 and a bridge/device interface 634). In a third mode of operation, routing circuitry 690 may be operable to establish a communication link between a host controller 620 and another host controller 620 (e.g., through a first host/bridge interface 624 and a second host/bridge interface 624).

In some embodiments, bridge controller 640 may comprise an IO selection register 692 having an output coupled to IO selection input 691. In various embodiments, bridge controller 640 may comprise a plurality of IO selection inputs 691 (and possibly IO selection registers 692) to enable the establishment of a plurality of corresponding communication links between any host controller 620 and any IO bridge 650, and/or between any host controller 620 and any device controller 630, and/or between any host controller 620 and any other host controller 620.

Bridge controller 640 may also comprise a device selection input 694, which may be coupled to routing circuitry 690. Device selection input 694 may have one of a first value and a second value, and routing circuitry 690 may be operable to establish a USB 2.0 compliant communication link between a host controller 620 and different device controllers 630 on the basis of device selection input 694. When device selection input 694 has the first value, a downstream translation circuitry 665 may be operable to process a transaction received on a host interface 624 and to generate a transaction for a first device interface 634, and the upstream translation circuitry 685 may be operable to process a transaction received on the first device interface 634 and to generate a transaction for the host interface 624. When device selection input 694 has the second value, the downstream translation circuitry 665 may be operable to process a transaction received on the host interface 624 and to generate a transaction for the second device interface 634, and the upstream translation circuitry 685 may be operable to process a transaction received on the second device interface 634 and to generate a transaction for the host interface 624.

In some embodiments, device selection input 694 may have additional values, which may enable routing circuitry 690 to establish a USB 2.0 compliant communication link between the host controller 620 and additional device controllers 630.

In various embodiments, bridge controller 640 may accordingly comprise various selection inputs coupled to routing circuitry 690, which may couple any of the host controllers 620 to any of the IO blocks 650 (in a first mode of operation), and may couple any of the host controllers 620 to any of the device controllers 630 (in a second mode of operation), and may couple any of the host controllers 620 to another host controller 620 (in a third mode of operation).

Bridge controller 640 may additionally comprise one or more MISR circuitries 689, which correspond respectively with each host controller 620 and/or each device controller 630. A MISR circuitry 689 may comprise a device signature calculation circuitry (which may be substantially similar to device signature calculation circuitry 436) and/or a MISR multiplexor (which may be substantially similar to MISR multiplexor 438). MISR circuitries 689 may accordingly comprise MISR registers for various host controllers 620 and/or device controllers 630.

Figure 7:
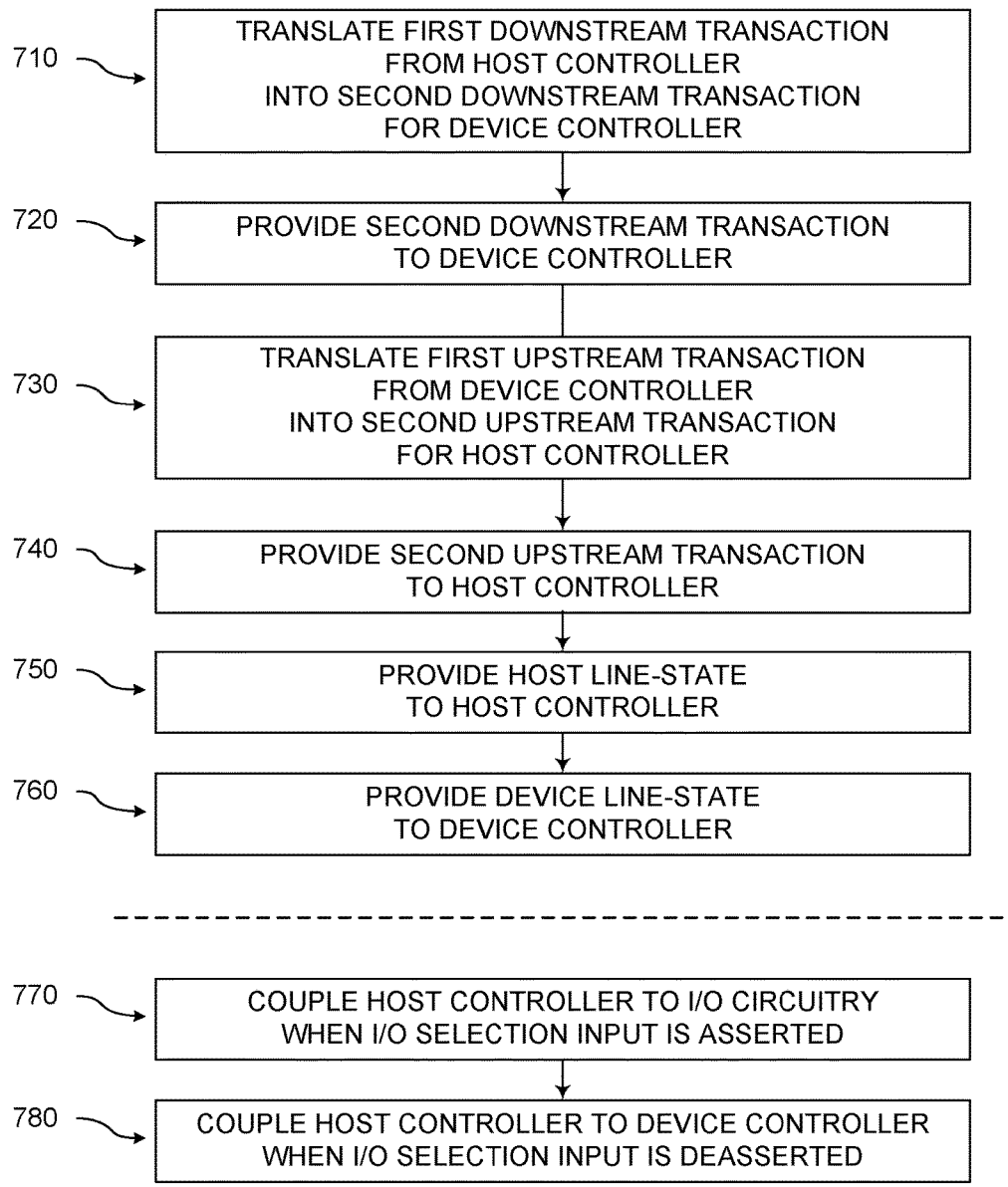
FIG. 7 illustrates a method for bridge controller operation, in accordance with some embodiments of the disclosure.

FIG. 7 illustrates a method for bridge controller operation, in accordance with some embodiments of the disclosure. A method 700 may comprise a translating 710, a providing 720, a translating 730, a providing 740, a providing 750, a providing 760, a coupling 770, and a coupling 780.

In translating 710, a first downstream transaction from a host controller on a component may be translated (e.g., by a bridge controller circuitry on the component) into a second downstream transaction for a device controller on the component. In providing 720, the second downstream transaction may be provided (e.g., by the bridge controller circuitry) to the device controller over a device interface on the component. Similarly, in translating 730, a first upstream transaction from the device controller may be translated (e.g., by the bridge controller circuitry) into a second upstream transaction for the host controller. In providing 740, the second upstream transaction may be provided (e.g., by the bridge controller circuitry) to the host controller over a host interface on the component.

In providing 750, a host line-state may be provided to the host controller (e.g., by the bridge controller circuitry), and in providing 760, a device line-state may be provided to the device controller (e.g., by the bridge controller circuitry). In some embodiments, the host line-state state and/or the device line-state state may be operable to have an SE0-state value, a J-state value, or a K-state value. In some embodiments, the host line-state state and the device line-state state may be driven to the same values, or may otherwise be the same state.

For some embodiments, the device controller may be coupled to a device that comprises at least one of: a memory interface, a security engine, and a manageability engine. In some embodiments, both the host interface and the device interface may comprise a set of UTMI compliant inputs and outputs.

In coupling 770, the host controller may be coupled (e.g., by the bridge controller circuitry) to an IO circuitry when an IO selection input is asserted. In coupling 780, the host controller may be coupled (e.g., by the bridge controller circuitry) to the device controller when the IO selection input is de-asserted.

Although the actions in the flowchart with reference to FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause one or more processors to perform an operation comprising method 700. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 8:
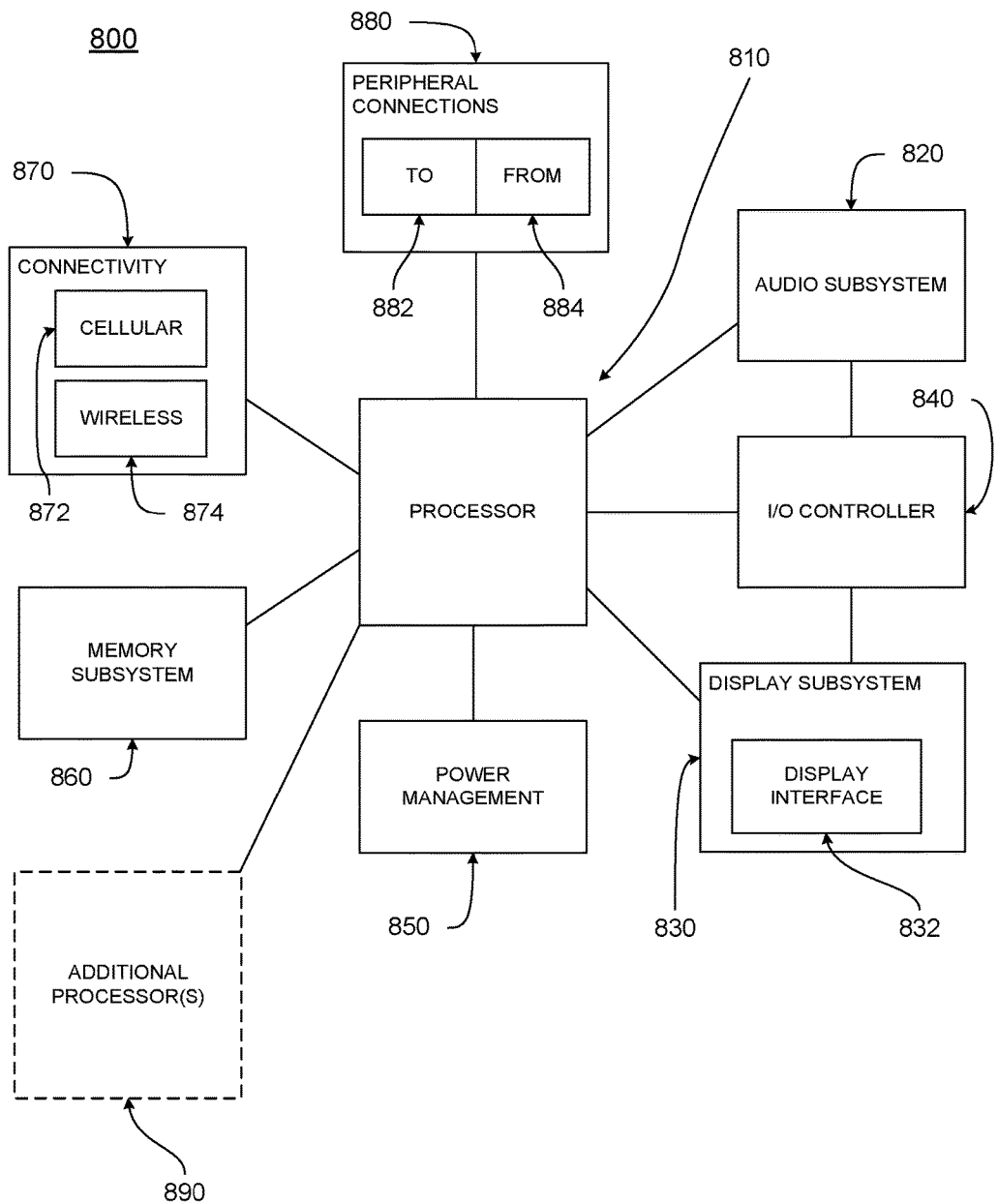
FIG. 8 illustrates computing device with a bridge controller, in accordance with some embodiments of the disclosure.

FIG. 8 illustrates computing device with a bridge controller, in accordance with some embodiments of the disclosure. Computing device 800 may be a bridge controller, in accordance with some embodiments of the disclosure. It will be understood that certain components of computing device 800 are shown generally, and not all components of such a device are shown FIG. 8. Moreover, while some of the components may be physically separate, others may be integrated within the same physical package, or even on the same physical silicon die. Accordingly, the separation between the various components as depicted in FIG. 8 may not be physical in some cases, but may instead be a functional separation. It is also pointed out that those elements of FIG. 8 having the same names or reference numbers as the elements of any other figure can operate or function in any manner similar to that described, but are not limited to such.

In various embodiments, the components of computing device 800 may include any of a processor 810, an audio subsystem 820, a display subsystem 830, an I/O controller 840, a power management component 850, a memory subsystem 860, a connectivity component 870, one or more peripheral connections 880, and one or more additional processors 890. In some embodiments, processor 810 may include a bridge controller, in accordance with some embodiments of the disclosure. In various embodiments, however, any of the components of computing device 800 may include a bridge controller, in accordance with some embodiments of the disclosure.

In addition, one or more components of computing device 800 may include an interconnect fabric having a plurality of ports, such as a router, a network of routers, or a Network-on-a-Chip (NoC). For example, one or more components of computing device 800 may include an interconnect fabric (e.g., interconnect fabric 110 or interconnect fabric 210), one or more host controllers that may have one or more ports (e.g., host controller 120, host controller 220, or host controller 620), one or more device controllers that may have one or more ports (e.g., device controller 130, device controller 230, or device controller 630), one or more IO blocks that may have one or more ports (e.g., IO block 150, IO block 250, or IO block 650), and one or more bridge controllers (e.g., bridge controller 140, bridge controller 240, or bridge controller 640).

In some embodiments, computing device 800 may be a mobile device which may be operable to use flat surface interface connectors. In one embodiment, computing device 800 may be a mobile computing device, such as a computing tablet, a mobile phone or smart-phone, a wireless-enabled e-reader, or other wireless mobile device. The various embodiments of the present disclosure may also comprise a network interface within 870 such as a wireless interface so that a system embodiment may be incorporated into a wireless device, for example a cell phone or personal digital assistant.

Processor 810 may be a general-purpose processor or CPU (Central Processing Unit). In some embodiments, processor 810 may include one or more physical devices, such as microprocessors, application processors, microcontrollers, programmable logic devices, or other processing means. The processing operations performed by processor 810 may include the execution of an operating platform or operating system on which applications and/or device functions may then be executed. The processing operations may also include operations related to one or more of the following: audio IO; display IO; power management; connecting computing device 800 to another device; and/or I/O (input/output) with a human user or with other devices.

Audio subsystem 820 may include hardware components (e.g., audio hardware and audio circuits) and software components (e.g., drivers and/or codecs) associated with providing audio functions to computing device 800. Audio functions can include speaker and/or headphone output as well as microphone input. Devices for such functions can be integrated into computing device 800, or connected to computing device 800. In one embodiment, a user interacts with computing device 800 by providing audio commands that are received and processed by processor 810.

Display subsystem 830 may include hardware components (e.g., display devices) and software components (e.g., drivers) that provide a visual and/or tactile display for a user to interact with computing device 800. Display subsystem 830 may include a display interface 832, which may be a particular screen or hardware device used to provide a display to a user. In one embodiment, display interface 832 includes logic separate from processor 810 to perform at least some processing related to the display. In some embodiments, display subsystem 830 includes a touch screen (or touch pad) device that provides both output and input to a user.

I/O controller 840 may include hardware devices and software components related to interaction with a user. I/O controller 840 may be operable to manage hardware that is part of audio subsystem 820 and/or display subsystem 830. Additionally, I/O controller 840 may be a connection point for additional devices that connect to computing device 800, through which a user might interact with the system. For example, devices that can be attached to computing device 800 might include microphone devices, speaker or stereo systems, video systems or other display devices, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of computing device 800. Additionally, audio output can be provided instead of, or in addition to, display output. In another example, if display subsystem 830 includes a touch screen, the display device may also act as an input device, which can be at least partially managed by I/O controller 840. There can also be additional buttons or switches on computing device 800 to provide I/O functions managed by I/O controller 840.

In some embodiments, I/O controller 840 manages devices such as accelerometers, cameras, light sensors or other environmental sensors, or other hardware that can be included in computing device 800. The input can be part of direct user interaction, and may provide environmental input to the system to influence its operations (such as filtering for noise, adjusting displays for brightness detection, applying a flash for a camera, or other features).

Power management component 850 may include hardware components (e.g., power management devices and/or circuitry) and software components (e.g., drivers and/or firmware) associated with managing battery power usage, battery charging, and features related to power saving operation.

Memory subsystem 860 may include one or more memory devices for storing information in computing device 800. Memory subsystem 860 can include nonvolatile memory devices (whose state does not change if power to the memory device is interrupted) and/or volatile memory devices (whose state is indeterminate if power to the memory device is interrupted). Memory subsystem 860 can store application data, user data, music, photos, documents, or other data, as well as system data (whether long-term or temporary) related to the execution of the applications and functions of computing device 800.

Some portion of memory subsystem 860 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 870 may include a network interface, such as a cellular interface 872 or a wireless interface 874 (so that an embodiment of computing device 800 may be incorporated into a wireless device such as a cellular phone or a personal digital assistant). In some embodiments, connectivity component 870 includes hardware devices (e.g., wireless and/or wired connectors and communication hardware) and software components (e.g., drivers and/or protocol stacks) to enable computing device 800 to communicate with external devices. Computing device 800 could include separate devices, such as other computing devices, wireless access points or base stations, as well as peripherals such as headsets, printers, or other devices.

In some embodiments, connectivity component 870 can include multiple different types of network interfaces, such as one or more wireless interfaces for allowing processor 810 to communicate with another device. To generalize, computing device 800 is illustrated with cellular interface 872 and wireless interface 874. Cellular interface 872 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 874 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 880 may include hardware interfaces and connectors, as well as software components (e.g., drivers and/or protocol stacks) to make peripheral connections. It will be understood that computing device 800 could both be a peripheral device to other computing devices (via "to" 882), as well as have peripheral devices connected to it (via "from" 884). The computing device 800 may have a "docking" connector to connect to other computing devices for purposes such as managing content on computing device 800 (e.g., downloading and/or uploading, changing, synchronizing). Additionally, a docking connector can allow computing device 800 to connect to certain peripherals that allow computing device 800 to control content output, for example, to audiovisual or other systems.

In addition to a proprietary docking connector or other proprietary connection hardware, computing device 800 can make peripheral connections 880 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An example provides an apparatus comprising: an interface comprising a line-state output; and a state machine to set the line-state output to a value that is one of: a single-ended-zero-state (SE0-state) value, a J-state value, or a K-state value, wherein the state machine is to have a line-state state that is one of: a reset state, a full-speed-detect state, a low-speed-detect state, a host-drive-SE0 state, a device-response-K state, a device-response-SQ state, a host-response-JK state, an idle-done state, or a full-speed-low-speed-reset state; and wherein the value of line-state output is based at least in part upon the line-state state.

Some embodiments provide an apparatus wherein the interface is a first interface, and the apparatus comprising: a first translation circuitry to process a transaction received on the first interface and to generate a transaction for a second interface.

Some embodiments provide an apparatus comprising: a second translation circuitry to process a transaction received on the second interface and to generate a transaction for the first interface.

Some embodiments provide an apparatus wherein the interface is a host interface, the apparatus comprising: an input/output (IO)-block interface; an IO selection input; and a third circuitry to couple the host interface to the IO-block interface when the IO selection input is to be asserted, and to couple the host interface to a device interface when the IO selection input is to be de-asserted.

Some embodiments provide an apparatus comprising: an IO selection register comprising an output coupled to the IO selection input.

Some embodiments provide an apparatus wherein the state machine is to set the line-state output to the SE0-state value when the line-state state is one of: the host-drive-SE0 state, the device-response-SQ state, the idle-done state, or the full-speed-low-speed-reset state; wherein the state machine is to set the line-state output to the K-state value when the line-state state is one of: the device-response-K state or the low-speed-detect state; and wherein the state machine is to set the line-state output to the J-state value when the line-state state is the full-speed-detect state.

Some embodiments provide an apparatus comprising: a speed-mode input to have a value that is one of: a low-speed value, a full-speed value, or a high-speed value, wherein, when the line-state state is the reset state, the state machine is to set the line-state output to the J-state value while the speed-mode input has the low-speed value, and otherwise set the line-state output to the K-state value.

Some embodiments provide an apparatus comprising: a speed-mode input to have a value that is one of: a low-speed value, a full-speed value, or a high-speed value; a host data input; a host transmit-valid input; and a host op-mode input to have a value that is one of: a normal-operation value, a non-driving value, a disable value, or a normal-operation-without-automatic-generation value, wherein, when the line-state state is the host-response-K state, the state machine is to set the line-state output to the K-state value while the host data input has a zero value, the host transmit-valid input is asserted, and the host op-mode input has the disable value, and otherwise set the line-state output to the J-state value.

Some embodiments provide an apparatus wherein the first interface is a host interface, and wherein the second interface is a first device interface, and the apparatus comprising: a second device interface; and a device selection input to have one of: a first value, or a second value, wherein, when the device selection input has the first value, the first translation circuitry is to process a transaction received on the host interface and to generate a transaction for the first device interface, and the second translation circuitry is to process a transaction received on the first device interface and to generate a transaction for the host interface.

Some embodiments provide an apparatus wherein the first interface is a host interface, and wherein the second interface is a first device interface, and the apparatus comprising: a second device interface; and a device selection input to have one of: a first value, or a second value, wherein, when the device selection input has the second value, the first translation circuitry is to process a transaction received on the host interface and to generate a transaction for the second device interface, and the second translation circuitry is to process a transaction received on the second device interface and to generate a transaction for the host interface.

Some embodiments provide an apparatus wherein both the first interface and the second interface comprise a set of USB 2.0 Transceiver Macrocell Interface (UTMI) compliant inputs and outputs.

Some embodiments provide an apparatus comprising a signature calculation circuitry comprising a Multiple Input Shift Register (MISR).

An example provides a system comprising a memory, a processor coupled to the memory, and a wireless interface for allowing the processor to communicate with another device, the system including an apparatus as disclosed and discussed above.

An example provides an apparatus comprising: a host controller; a device controller; and a bridge controller coupled to the host controller by a first interface and coupled to the device controller by a second interface, the bridge controller comprising: a downstream translation circuitry to process a transaction received on the first interface and to generate a transaction for the second interface; an upstream translation circuitry to process a transaction received on the second interface and to generate a transaction for the first interface; and a state machine to set a line-state output of the first interface to a value that is one of: an SE0-state value, a J-state value, or a K-state value, wherein the host controller is to generate a transaction for the first interface based at least in part upon the state of the line-state output; and wherein the device controller is to generate a transaction for the second interface based at least in part upon the state of the line-state output.

Some embodiments provide an apparatus wherein the device controller is coupled to a device that comprises at least one of: a memory interface, a security engine, or a manageability engine.

Some embodiments provide an apparatus comprising: an input/output (IO) circuitry; an IO selection input; and a routing circuitry to couple the host controller to the IO circuitry when the IO selection input is asserted, and to couple the host controller to the device controller when the IO selection input is de-asserted.

Some embodiments provide an apparatus comprising: an IO selection register comprising an output coupled to the IO selection input.

Some embodiments provide an apparatus wherein the first interface is a host interface, and the second interface is a first device interface, and the apparatus comprising: a second device interface; and a device selection input to have one of: a first value, or a second value, wherein the bridge controller is coupled to the second device controller by the second device interface; wherein, when the device selection input has the first value, the downstream translation circuitry is to process a transaction received on the host interface and to generate a transaction for the first device interface, and the upstream translation circuitry is to process a transaction received on the first device interface and to generate a transaction for the host interface.

Some embodiments provide an apparatus wherein the first interface is a host interface, and the second interface is a first device interface, and the apparatus comprising: a second device interface; and a device selection input to have one of: a first value, or a second value, wherein the bridge controller is coupled to the second device controller by the second device interface; wherein, when the device selection input has the second value, the downstream translation circuitry is to process a transaction received on the host interface and to generate a transaction for the second device interface, and the upstream translation circuitry is to process a transaction received on the second device interface and to generate a transaction for the host interface.

Some embodiments provide an apparatus wherein the state machine is to have a line-state state that is one of: a reset state, a full-speed-detect state, a low-speed-detect state, a host-drive-SE0 state, a device-response-K state, a device-response-SQ state, a host-response-JK state, an idle-done state, or a full-speed-low-speed-reset state.

Some embodiments provide an apparatus wherein the state machine is to set the line-state output of the first interface to the SE0-state value when the line-state state is one of: the host-drive-SE0 state, the device-response-SQ state, the idle-done state, or the full-speed-low-speed-reset state; wherein the state machine is to set the line-state output of the first interface to the K-state value when the line-state state is one of: the device-response-K state and the low-speed-detect state; and wherein the state machine is to set the line-state output of the first interface to the J-state value when the line-state state is the full-speed-detect state.

Some embodiments provide an apparatus comprising: a speed-mode input to have a value that is one of: a low-speed value, a full-speed value, or a high-speed value; wherein, when the line-state state is the reset state, the state machine is to set the line-state output of the first interface to the J-state value while the speed-mode input has the low-speed value, and otherwise set the line-state output of the first interface to the K-state value.

Some embodiments provide an apparatus comprising: a host data input; a host transmit-valid input; and a host op-mode input to have a value that is one of: a normal-operation value, a non-driving value, a disable value, or a normal-operation-without-automatic-generation value, wherein, when the line-state state is the host-response-JK state, the line-state state machine is to set the line-state output of the first interface to the K-state value while the host data input has a zero value, the host transmit-valid input is asserted, and the host op-mode input has the disable value, and otherwise set the line-state output of the first interface to the J-state value.

Some embodiments provide an apparatus wherein both the first interface and the second interface comprise a set of USB 2.0 Transceiver Macrocell Interface (UTMI) compliant inputs and outputs.

Some embodiments provide an apparatus comprising a signature calculation circuitry comprising a Multiple Input Shift Register (MISR).

An example provides a system comprising a memory, a processor coupled to the memory, and a wireless interface for allowing the processor to communicate with another device, the system including an apparatus as disclosed and discussed above.

An example provides a system comprising a memory, a processor coupled to the memory, a wireless interface for allowing the processor to communicate with another device, and a computing device comprising: an interface comprising a line-state output; and a state machine to set the line-state output to a value that is one of: a single-ended-zero-state (SE0-state) value, a J-state value, or a K-state value, wherein the state machine is to have a line-state state that is one of: a reset state, a full-speed-detect state, a low-speed-detect state, a host-drive-SE0 state, a device-response-K state, a device-response-SQ state, a host-response-JK state, an idle-done state, or a full-speed-low-speed-reset state; and wherein the value of line-state output is based at least in part upon the line-state state.

Some embodiments provide a system wherein the interface is a first interface, and the computing device comprising: a first translation circuitry to process a transaction received on the first interface and to generate a transaction for a second interface.

Some embodiments provide a system comprising: a second translation circuitry to process a transaction received on the second interface and to generate a transaction for the first interface.

Some embodiments provide a system wherein the interface is a first interface, and the computing device comprising: a second interface; a device controller coupled to the second interface; and a service device coupled to the device controller, the service device comprising at least one of: a memory interface, a security engine, or a manageability engine.

Some embodiments provide a system wherein the interface is a first interface, and the computing device comprising: a second interface; wherein both the first interface and the second interface comprise a set of USB 2.0 Transceiver Macrocell Interface (UTMI) compliant inputs and outputs.

An example provides a method comprising: translating a first downstream transaction from a host controller on a component into a second downstream transaction for a device controller on the component; providing the second downstream transaction to the device controller over a device interface on the component; translating a first upstream transaction from the device controller into a second upstream transaction for the host controller; providing the second upstream transaction to the host controller over a host interface on the component; providing a host line-state state to the host controller; and providing a device line-state state to the device controller.

Some embodiments provide a method wherein the device controller is coupled to a device that comprises at least one of: a memory interface, a security engine, or a manageability engine.

Some embodiments provide a method wherein both the host interface and the device interface comprise a set of USB 2.0 Transceiver Macrocell Interface (UTMI) compliant inputs and outputs.

Some embodiments provide a method comprising: coupling the host controller to an input/output (IO) circuitry when an IO selection input is asserted; and coupling the host controller to the device controller when the IO selection input is de-asserted.

Some embodiments provide a method wherein the host line-state state is to have a value that is one of: an SE0-state value, a J-state value, or a K-state value; and wherein the device line-state state is to have a value that is one of: an SE0-state value, a J-state value, or a K-state value.

A machine readable storage medium having machine executable instructions stored thereon that, when executed, cause one or more processors to perform a method according to various of the examples above.

An example provides an apparatus comprising: means for translating a first downstream transaction from a host controller on a component into a second downstream transaction for a device controller on the component; means for providing the second downstream transaction to the device controller over a device interface on the component; means for translating a first upstream transaction from the device controller into a second upstream transaction for the host controller; means for providing the second upstream transaction to the host controller over a host interface on the component; means for providing a host line-state state to the host controller; and means for providing a device line-state state to the device controller.

Some embodiments provide an apparatus wherein the device controller is coupled to a device that comprises at least one of: a memory interface, a security engine, or a manageability engine.

Some embodiments provide an apparatus wherein both the host interface and the device interface comprise a set of USB 2.0 Transceiver Macrocell Interface (UTMI) compliant inputs and outputs.

Some embodiments provide an apparatus comprising: means for coupling the host controller to an input/output (IO) circuitry when an IO selection input is asserted; and means for coupling the host controller to the device controller when the IO selection input is de-asserted.

Some embodiments provide an apparatus wherein the host line-state state is to have a value that is one of: an SE0-state value, a J-state value, or a K-state value; and wherein the device line-state state is to have a value that is one of: an SE0-state value, a J-state value, or a K-state value.

Some embodiments provide an apparatus wherein the translating of the first downstream transaction, the providing of the second downstream transaction, the translating of the first upstream transaction, the providing of the second upstream transaction, the providing of the host line-state state, and the providing of the device line-state state are performed by a bridge controller circuitry.

An example provides a machine readable storage medium having machine executable instructions stored thereon that, when executed, cause one or more processors to perform an operation comprising: translate a first downstream transaction from a host controller on the component into a second downstream transaction for a device controller on the component; provide the second downstream transaction to the device controller over a device interface on the component; translate a first upstream transaction from the device controller into a second upstream transaction for the host controller; provide the second upstream transaction to the host controller over a host interface on the component; provide a host line-state state to the host controller; and provide a device line-state state to the device controller.

Some embodiments provide a machine readable storage medium wherein the device controller is coupled to a device that comprises at least one of: a memory interface, a security engine, or a manageability engine.

Some embodiments provide a machine readable storage medium wherein both the host interface and the device interface comprise a set of USB 2.0 Transceiver Macrocell Interface (UTMI) compliant inputs and outputs.

Some embodiments provide a machine readable storage medium the operation comprising: couple the host controller to an input/output (IO) circuitry when an IO selection input is asserted; and couple the host controller to the device controller when the IO selection input is de-asserted.

Some embodiments provide a machine readable storage medium wherein the host line-state state is to have a value that is one of: an SE0-state value, a J-state value, or a K-state value; and wherein the device line-state state is to have a value that is one of: an SE0-state value, a J-state value, or a K-state value.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    an interface comprising a line-state output; and
        a state machine to set the line-state output to a value that is one of: a single-ended zero-state (SE0-state) value, a J-state value, or a K-state value,
        wherein the state machine has a plurality of states including: a reset state, a full speed-detect state, a low-speed-detect state, a host-drive-SE0 state, a device-response-K state, a device-response-SQ state, a host response-JK state, an idle-done state, and a full-speed-low-speed-reset state;
        wherein the state machine has a line-state state that is one of the plurality of states; and
        wherein the value of the line-state output is based at least in part upon the line-state state.

2. The apparatus of claim 1, wherein the interface is a first interface, and the apparatus comprising:
    a first translation circuitry to process a transaction received on the first interface and to generate a transaction for a second interface.

3. The apparatus of claim 2, comprising:
    a second translation circuitry to process a transaction received on the second interface and to generate a transaction for the first interface.

4. The apparatus of claim 1,
    wherein the state machine is to set the line-state output to the SE0-state value when the line-state state is any of: the host-drive-SE0 state, the device-response-SQ state, the idle-done state, or the full-speed-low-speed-reset state;
    wherein the state machine is to set the line-state output to the K-state value when the line-state state is any of: the device-response-K state or the low-speed-detect state; and
    wherein the state machine is to set the line-state output to the J-state value when the line-state state is the full-speed-detect state.

5. The apparatus of claim 4, comprising:
    a speed-mode input to have a value that is one of: a low-speed value, a full-speed value, or a high-speed value,
    wherein, when the line-state state is the reset state, the state machine is to set the line-state output to the J-state value while the speed-mode input has the low-speed value, and otherwise set the line-state output to the K-state value.

6. The apparatus of claim 5, comprising:
    a speed-mode input to have a value that is one of: a low-speed value, a full-speed value, or a high-speed value;
    a host data input;
    a host transmit-valid input; and
    a host op-mode input to have a value that is one of: a normal-operation value, a non-driving value, a disable value, or a normal-operation-without-automatic-generation value,
    wherein, when the line-state state is the host-response-JK state, the state machine is to set the line-state output to the K-state value while the host data input has a zero value, the host transmit-valid input is asserted, and the host op-mode input has the disable value, and otherwise set the line-state output to the J-state value.

7. The apparatus of claim 3, wherein the first interface is a host interface, and wherein the second interface is a first device interface, and the apparatus comprising:
    a second device interface; and
    a device selection input to have one of: a first value, or a second value,
    wherein, when the device selection input has the first value, the first translation circuitry is to process a transaction received on the host interface and to generate a transaction for the first device interface, and the second translation circuitry is to process a transaction received on the first device interface and to generate a transaction for the host interface.

8. The apparatus of claim 3, wherein the first interface is a host interface, and wherein the second interface is a first device interface, and the apparatus comprising:

a second device interface; and
a device selection input to have one of: a first value, or a second value,
wherein, when the device selection input has the second value, the first translation circuitry is to process a transaction received on the host interface and to generate a transaction for the second device interface, and the second translation circuitry is to process a transaction received on the second device interface and to generate a transaction for the host interface.

9. The apparatus of claim 2, wherein both the first interface and the second interface comprise a set of USB 2.0 Transceiver Macrocell Interface (UTMI) compliant inputs and outputs.

10. An apparatus comprising:
a host controller;
a device controller; and
a bridge controller coupled to the host controller by a first interface and coupled to the device controller by a second interface, the bridge controller comprising:
a downstream translation circuitry to process a transaction received on the first interface and to generate a transaction for the second interface;
an upstream translation circuitry to process a transaction received on the second interface and to generate a transaction for the first interface; and
a state machine incorporating sequential logic to set a line-state output of the first interface to a value that is one of: a single-ended-zero-state (SE0-state) value, a J-state value, or a K-state value,
wherein the state machine has a plurality of states including: a reset state, a full-speed-detect state, a low-speed-detect state, a host-drive-SE0 state, a device-response-K state, a device-response-SQ state, a host-response-JK state, an idle-done state, and a full-speed-low-speed-reset state;
wherein the state machine has a line-state state that is one of the plurality of states;
wherein the host controller is to generate a transaction for the first interface based at least in part upon the state of the line-state output; and
wherein the device controller is to generate a transaction for the second interface based at least in part upon the state of the line-state output.

11. The apparatus of claim 10, wherein the device controller is coupled to a device that comprises at least one of: a memory interface, a security engine, or a manageability engine.

12. The apparatus of claim 10, wherein the first interface is a host interface, and the second interface is a first device interface, and the apparatus comprising:
a second device interface; and
a device selection input to have one of: a first value, or a second value,
wherein the bridge controller is coupled to the second device controller by the second device interface;
wherein, when the device selection input has the first value, the downstream translation circuitry is to process a transaction received on the host interface and to generate a transaction for the first device interface, and the upstream translation circuitry is to process a transaction received on the first device interface and to generate a transaction for the host interface.

13. The apparatus of claim 10, wherein the first interface is a host interface, and the second interface is a first device interface, and the apparatus comprising:
a second device interface; and
a device selection input to have one of: a first value, or a second value,
wherein the bridge controller is coupled to the second device controller by the second device interface;
wherein, when the device selection input has the second value, the downstream translation circuitry is to process a transaction received on the host interface and to generate a transaction for the second device interface, and the upstream translation circuitry is to process a transaction received on the second device interface and to generate a transaction for the host interface.

14. The apparatus of claim 10,
wherein the state machine is to set the line-state output of the first interface to the SE0-state value when the line-state state is any of: the host-drive-SE0 state, the device-response-SQ state, the idle-done state, or the full-speed-low-speed-reset state;
wherein the state machine is to set the line-state output of the first interface to the K-state value when the line-state state is any of: the device-response-K state and the low-speed-detect state; and
wherein the state machine is to set the line-state output of the first interface to the J-state value when the line-state state is the full-speed-detect state.

15. The apparatus of claim 14:
a speed-mode input to have a value that is one of: a low-speed value, a full-speed value, or a high-speed value;
wherein, when the line-state state is the reset state, the state machine is to set the line-state output of the first interface to the J-state value while the speed-mode input has the low-speed value, and otherwise set the line-state output of the first interface to the K-state value.

16. The apparatus of claim 15, comprising:
a host data input;
a host transmit-valid input; and
a host op-mode input to have a value that is one of: a normal-operation value, a non-driving value, a disable value, or a normal-operation-without-automatic-generation value,
wherein, when the line-state state is the host-response-JK state, the line-state state machine is to set the line-state output of the first interface to the K-state value while the host data input has a zero value, the host transmit-valid input is asserted, and the host op-mode input has the disable value, and otherwise set the line-state output of the first interface to the J-state value.

17. A system comprising a memory, a processor coupled to the memory, a wireless interface for allowing the processor to communicate with another device, and a computing device comprising:
an interface comprising a line-state output; and
a state machine to set the line-state output to a value that is one of: a single-ended-zero state (SE0-state) value, a J-state value, or a K-state value,
wherein the state machine is to have has a plurality of states including: a reset state, a full-speed-detect state, a low-speed-detect state, a host-drive-SE0 state, a device-response-K state, a device-response-SQ state, a host response-JK state, an idle-done state, and a full-speed-low-speed-reset state;
wherein the state machine has a line-state state that is one of the plurality of states; and
wherein the value of the line-state output is based at least in part upon the line-state state.

18. The system of claim 17, wherein the interface is a first interface, and the computing device comprising:
- a second interface;
- a device controller coupled to the second interface; and
- a service device coupled to the device controller, the service device comprising at least one of: a memory interface, a security engine, or a manageability engine.

19. The system of claim 17, wherein the interface is a first interface, and the computing device comprising:
- a second interface;
- wherein both the first interface and the second interface comprise a set of USB 2.0 Transceiver Macrocell Interface (UTMI) compliant inputs and outputs.

* * * * *